(12) United States Patent
Manneschi et al.

(10) Patent No.: US 7,592,907 B2
(45) Date of Patent: Sep. 22, 2009

(54) METAL DETECTOR PRESENTING HIGH PERFORMANCE

(76) Inventors: Giovanni Manneschi, 17 Via XXV Aprile, I-52100 Arezzo (IT); Alessandro Manneschi, 15, via XXV Aprile, I-52100 Arezzo (IT)

( * ) Notice: Subject to any disclaimer, the term of this patent is extended or adjusted under 35 U.S.C. 154(b) by 277 days.

(21) Appl. No.: 11/499,073

(22) Filed: Aug. 3, 2006

(65) Prior Publication Data
US 2007/0030105 A1 Feb. 8, 2007

(30) Foreign Application Priority Data
Aug. 4, 2005 (EP) .................. 05291667

(51) Int. Cl.
*G08B 19/00* (2006.01)
*G08B 13/24* (2006.01)
*G01N 27/72* (2006.01)
(52) U.S. Cl. .............. 340/521; 340/551; 340/561; 340/572.1; 324/232; 109/6; 109/21
(58) Field of Classification Search ............ 340/521, 340/551
See application file for complete search history.

(56) References Cited

U.S. PATENT DOCUMENTS

| | | | | |
|---|---|---|---|---|
| 4,012,690 A | * | 3/1977 | Heytow | 324/243 |
| 4,779,048 A | * | 10/1988 | Aichele | 324/207.18 |
| 4,866,424 A | * | 9/1989 | Parks | 340/551 |
| 5,130,697 A | * | 7/1992 | McGinn | 340/551 |
| 5,397,986 A | | 3/1995 | Conway et al. | |
| 5,406,259 A | | 4/1995 | Manneschi | |
| 5,680,103 A | | 10/1997 | Turner et al. | |
| 5,859,532 A | | 1/1999 | Keller | |
| 5,992,094 A | | 11/1999 | Diaz | |
| 2004/0140798 A1 | | 7/2004 | Manneschi | |
| 2007/0030141 A1 | * | 2/2007 | Manneschi et al. | 340/500 |

FOREIGN PATENT DOCUMENTS

| | | |
|---|---|---|
| EP | 0 831 339 A | 3/1998 |
| EP | 1 219 976 A2 | 7/2002 |
| FR | 2 698 968 | 6/1994 |
| FR | 2 608 286 A | 6/1998 |
| WO | WO 03/069320 A2 | 8/2003 |

* cited by examiner

*Primary Examiner*—Donnie L Crosland
(74) *Attorney, Agent, or Firm*—Blakely, Sokoloff, Taylor & Zafman LLP

(57) ABSTRACT

A metal detector for control of protected access comprises two oblong shape vertical housings (10, 12), a structure (14) connecting the upper part of the vertical housings (10, 12) and emitting and receiving electrical coils (3, 5) provided in the housings (10, 12). Each of the two housings (10, 12) comprises two separate emitting (3) and/or receiving (5) coils. The coils operate so that each of the two housings (10, 12) comprises one emitting coil (TX) and one receiving coil (RX). The metal detector further comprises a controller for controlling operation of the emitting and receiving coils, so that when an emitting coil (TX1, TX2) provided in a housing (10, 12) is active, the two receiving coils (RX1, RX2) provided respectively in both the two housings are also simultaneously or subsequently active.

26 Claims, 4 Drawing Sheets

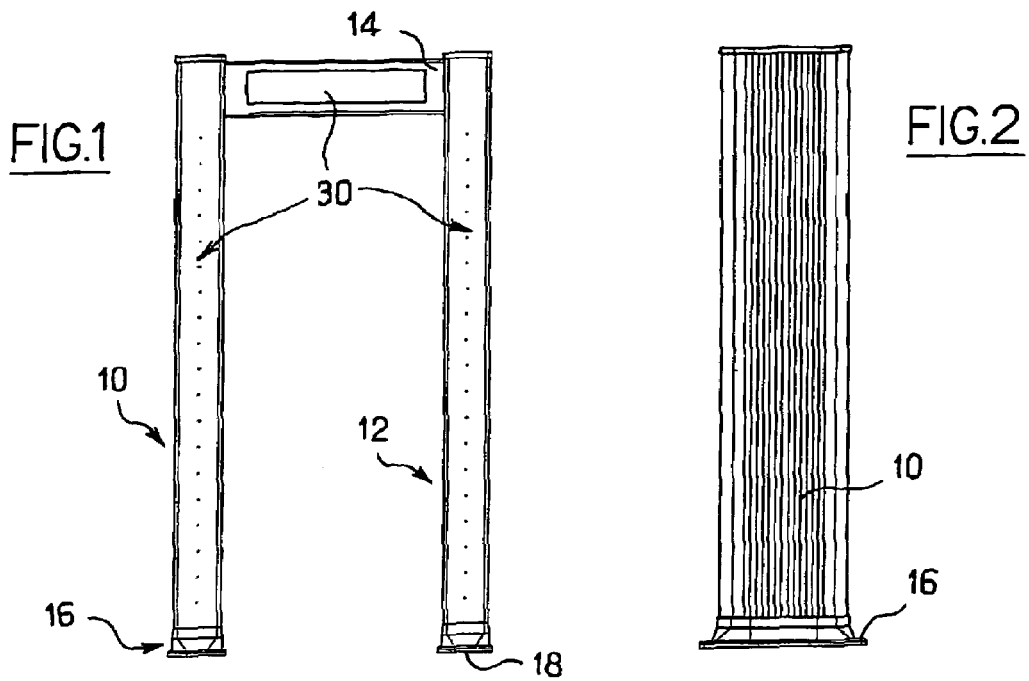
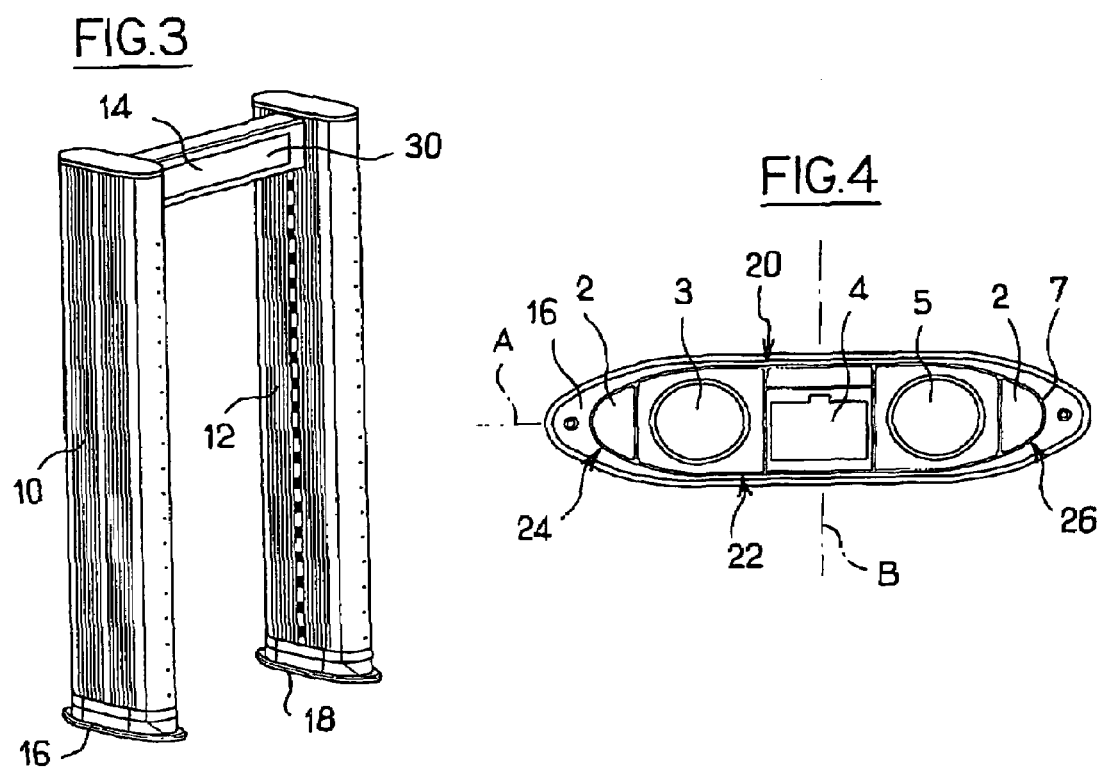

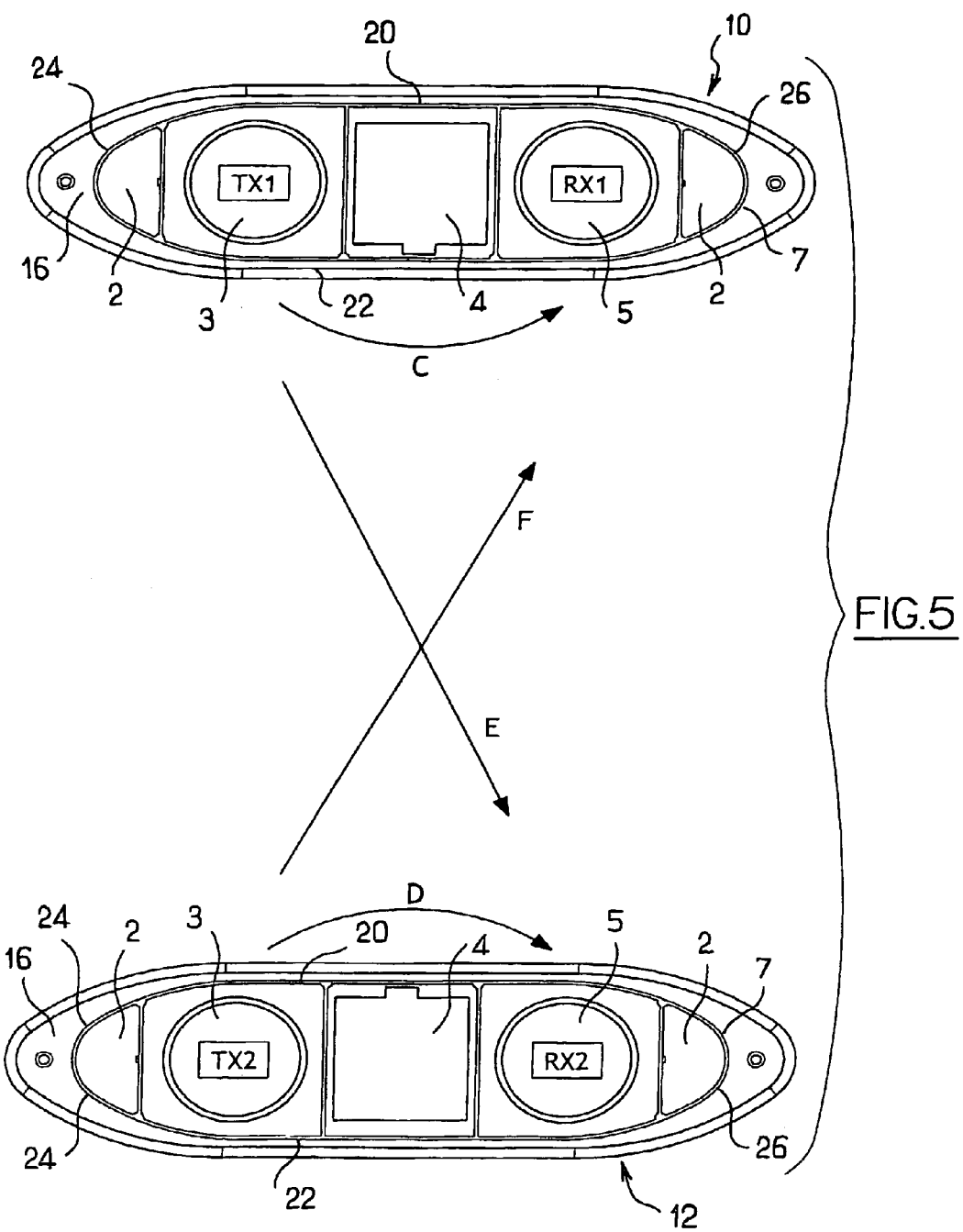

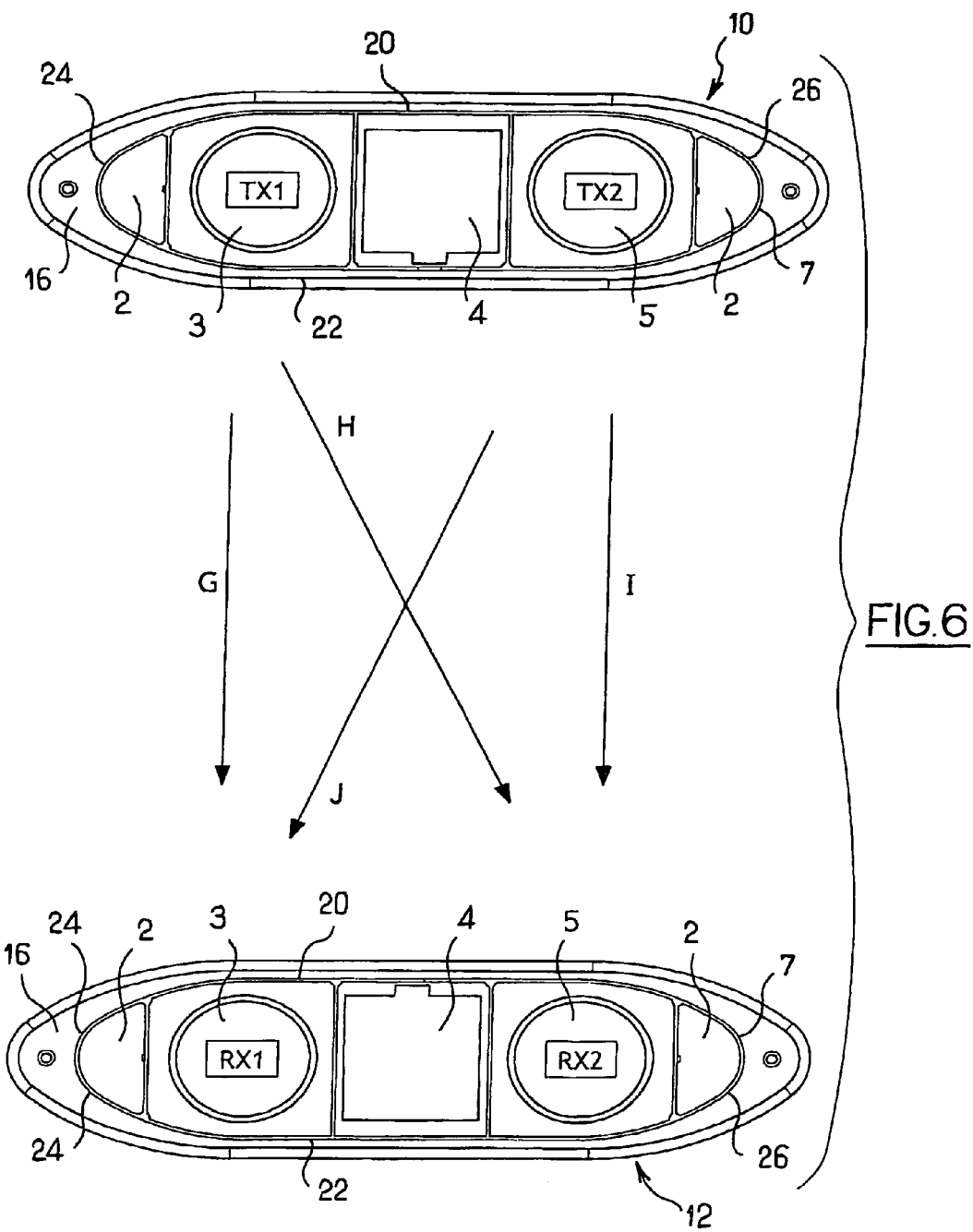

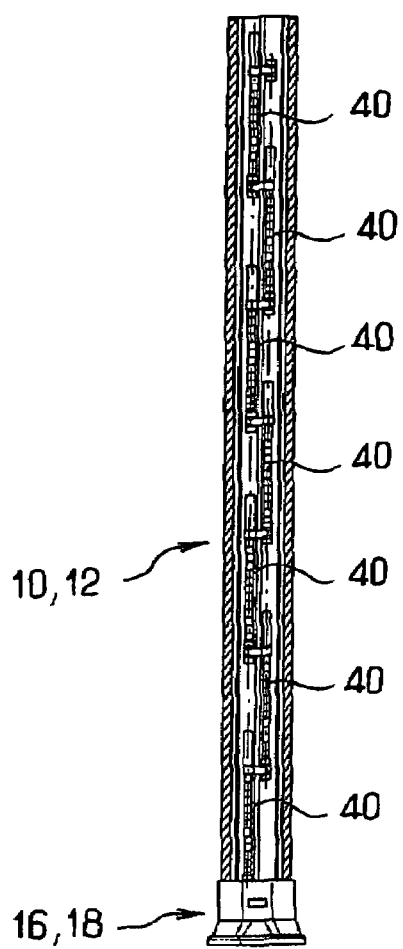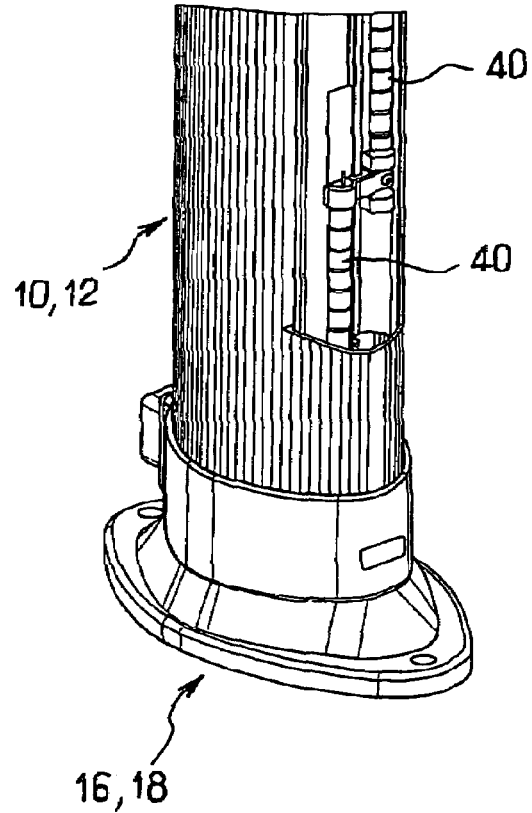

METAL DETECTOR PRESENTING HIGH PERFORMANCE

The present invention relates to the technical field of detectors, such as metal detectors, designed for detecting non-authorized objects in a zone having protected access.

More precisely the present invention relates to the field of the metal detectors provided to detect arms in airport or similar other sensitive areas, such as in official offices, Minister Buildings, schools, banks and so on.

Many kinds of metal detectors have been still disclosed.

Most of the metal detectors which are used todays in airport are in the form of a channel or portal comprising two vertical walls housing specific electric coils connected to a control unit, said two vertical walls being connected at their top side by a transverse horizontal beam.

Generally the coils housed in the walls are planar.

Examples of such known metal detectors are disclosed in the following prior art documents FR-2720519, FR-2775350, FR-2780585, FR-2694098, FR-2697919, FR-2698178, FR-2698968, FR-2608286, FR-2610417, FR-2607937, FR-2608286, FR-2607937, U.S. Pat. No. 6,362,739, U.S. Pat. No. 6,359,582, U.S. Pat. No. 6,344,818, U.S. Pat. No. 6,342,696, U.S. Pat. No. 6,218,830, U.S. Pat. No. 5,790,685, U.S. Pat. No. 5,680,103, U.S. Pat. No. 5,341,126, WO03/032011, US-20010042412, WO98/12573, WO97/50000, WO97/42527, EP-0740822, EP-0490921, WO91/03746, U.S. Pat. No. 5,121,105, WO88/07733, US-20030142853, US-20030128150, U.S. Pat. No. 6,507,309, U.S. Pat. No. 6,507,278, US-20020130804, U.S. Pat. No. 6,359,582, U.S. Pat. No. 6,150,810, U.S. Pat. No. 6,133,829, U.S. Pat. No. 5,726,628, U.S. Pat. No. 5,600,303, U.S. Pat. No. 5,692,029, U.S. Pat. No. 5,689,184, U.S. Pat. No. 5,227,800, U.S. Pat. No. 5,073,782, U.S. Pat. No. 5,039,981, U.S. Pat. No. 4,866,439, U.S. Pat. No. 4,866,424, U.S. Pat. No. 4,263,551, U.S. Pat. No. 4,019,053, U.S. Pat. No. 4,012,690, U.S. Pat. No. 3,971,983, U.S. Pat. No. 3,707,672, U.S. Pat. No. 4,987,767, U.S. Pat. No. 5,109,691, U.S. Pat. No. 4,449,115.

In some other metal detectors the coils are not planar but in form of a helicoidal or spiral winding(s) around a vertical and generally cylindrical support. These metal detectors comprising helicoidal or spiral winding(s) are generally named "column detectors". In view of the first cited detectors comprising planar coils, the metal detectors including helicoidal or spiral winding offer advantages in term of compacity and esthetic.

Examples of column detectors are disclosed in the following prior art documents FR-A-2607937, IT00072791, IT1214991.

The aim of the present invention is now to propose a new metal detector which presents detecting properties which are superior to those of the known devices.

In particular an auxiliary aim of the present invention is to propose a new detector which improves detection of a metal target whatever the geometry, the size and the orientation of the metal target is.

Another secondary aim of the invention is to propose a new detector which is not limited to detection of metal but which is suitable to detect also other kinds of attack means.

A specific aim of the present invention is to propose a new metal detector which presents a good esthetic and which is not cumbersome so that said detector may be used in any place including the hall of select building such as hotels, banks and so on.

The above aims are resolved according to the present invention with a detector comprising two oblong shape vertical housings, a structure connecting the upper part of said vertical housings and emitting and receiving electrical coils provided in said housings, characterized in that each of the two housings comprises two separate emitting and/or receiving coils, and the detector comprises means controlling operation of said emitting and receiving coils so that when an emitting coil provided in a housing is active, two other and spatially separate receiving coils are also simultaneously or subsequently active.

In a first alternative in accordance with the invention, each of the two housings comprises one emitting coil and one receiving coil and the detector comprises means controlling operation of said emitting and receiving coils so that when an emitting coil provided in a housing is active, the two receiving coils provided respectively in both the two housings are also simultaneously or subsequently active.

In a second alternative in accordance with the invention, each of the two housings comprises two emitting coils or two receiving coils and the detector comprises means controlling operation of said emitting and receiving coils so that when an emitting coil provided in a housing is active, the two receiving coils provided in the other housing are also simultaneously or subsequently active.

According to a preferential embodiment of the invention, the detector comprises furthermore at least an additional type of sensor provided in at least one of said housings in the vicinity of the emitting and receiving electric coils.

Preferentially said additional type of sensor is chosen in the group comprising at least one sensor suitable to detect ionizing radiations, at least one sensor suitable to detect the presence of explosive material or other specific substances, at least one sensor suitable for the badge readings of persons in transit.

Other characteristics, objects and advantages of the present invention appear on reading the following detailed description and from the accompanying drawings given as non-limiting examples, and in which:

FIGS. 1 and 2 illustrates two lateral view of a detector in accordance with the present invention, FIG. 3 is a perspective view of the same detector in accordance with the present invention, FIG. 4 is a cross horizontal section of a housing in accordance with the present invention, FIG. 5 is a cross horizontal section of a multi-sensorial control system portal in accordance with the present invention using two column coils in each housing, respectively as a transmitter and a receiver one, FIG. 6 is a cross horizontal section of a multi-sensorial control system portal in accordance with an alternative of the present invention, wherein each one of the two housings comprises two emitting coils or two receiving coils, FIG. 7 illustrates a lateral and partially cutted view of a housing in accordance with the present invention comprising a plurality of X/Gamma sensors staggered in the height of the housing, FIG. 8 illustrates a similar, partial and enlarged view of the same housing.

The detector of the invention is a multi-sensorial control system composed of two oblong and vertical shape housings 10, 12, surmounted by a connecting structure 14, and both of them supported by an oblong shape base 16, 18 of support that can be fixed at the floor and that does not present any edge, in order to avoid damages to persons in transit caused by accidental impacts.

The same enclosures or housings 10, 12, placed one in front of the other, basically form two surfaces that, surmounted by a box shape cross bar 14, constitute a portal used for the inspection of people passing through.

The two vertical enclosures 10, 12 house emitting and receiving coils associated with control means suitable to analyse electrical signals issued from the coils to detect metal pieces passing through the portal, between the two housings 10, 12. Such emitting and receiving coils and such control means are well-known in themselves for the man skilled in the art. Consequently such coils and such control means will not be described in detail in the following specification.

The portal in accordance with the invention differs from the other devices in use at present, as for instance the portals used in some airports, in that each of the two housings 10, 12 comprises two separate emitting and/or receiving coils, 3, 5, and the detector comprises means controlling operation of said emitting and receiving coils 3, 5 so that when an emitting coil 3 provided in a housing is active, two other and spatially separate receiving coils 5, are also simultaneously or subsequently active.

The effect and function of such a structure in accordance with the invention will be disclosed more in detail subsequently in regard of FIGS. 5 and 6.

According to an additional feature of the invention, preferentially the detector comprises furthermore additional control instruments located into its side enclosures 10, 12, together with the metal detector. The enclosures 10, 12 of the invention, can house one or more than one metal detector, one or more than one sensor suitable to detect ionizing radiations, one or more than one sensor suitable to signal the presence of explosive material as well as other substances, one or more sensors suitable for the badge reading of persons in transit.

These portals, as shown in FIGS. 1 to 3, appear as oblong shape housings, similar to those represented in the Italian patent no 00072791, but further lengthened as shown in FIG. 4 that shows, in reference 16, the boot or supporting base of an enclosure 10; in reference 2 a signalling displays indicating the transit height which refers to the detected materials such as: metal masses, radioactive elements, unusual chemical substances, badges and so on (preferably in accordance with the invention all the information issued by the plurality of sensors, such as metal, radioactive, chemical or badge sensors, are displayed on a common signalling display 2); in reference 3 a transmitting column type metal detector, similar to the one represented in the Italian patent no 1214991 of the same author; in reference 4, a space where sensors suitable to detect chemical substance molecules or other sensor such as badge sensor, are vertically placed; and in reference 5 a receiving column type metal detector, similar to the one represented in the Italian patent no 1214991. The spaces 4 may be provided with means suitable to pick or suction the molecules from chemical substances and to transfer these molecules to appropriate sensors. In the same space 4 are also placed and vertically assembled ionizing radiation sensors. The point 7 shows the oblong shape housing that, similar to an ellipse, gave the structure an harmonic solution, making the transit, as well as the controller's inspection, much easier.

According to the embodiment illustrated on FIG. 5, a transmitting or emitting coil 3 and a receiving coil 5 are provided respectively on each side of the central space 4, for both of the two housings 10, 12.

Typically but without any limitation, the ratio between the length and the width of the cross section of the housings 10, 12 is between 2 and 4, preferably about 2,75.

Moreover length of the cross section is typically between 60 and 100 cm preferably about 80 cm while the width of the cross section is typically between 20 and 35 cm preferably about 27.5 cm.

Typically but without any limitation the external surface of the housing comprises two plane and parallel panels 20, 22, connected at their ends by two rounded parts 24, 26.

Preferentially the housings 10, 12 in accordance with the invention have two perpendicular planes of symmetry A and B.

The sensorial structure organisation in accordance with the invention, wherein each of the two housings 10, 12 comprises two separate emitting and/or receiving coils 3, 5, and the detector comprises means controlling operation of said emitting and receiving coils so that when an emitting coil 3 provided in a housing is active, two other and spatially separate receiving coils 5 are also simultaneously or subsequently active, is considered optimal for the improvement of the present state-of-the-art.

If required, the same housings 10, 12 can be further lengthened so that to allow the positioning of additional transducers, or shortened by reducing the number of the transducers themselves, but without altering the inventive concept of the device that, in this solution, finds a rational, functional and compatible disposition of the instruments.

In fact, the configuration of FIG. 4 described above, is of smaller dimensions as regards the ones of the panel type walk through metal detectors in use at present in the market. Furthermore, it has the advantage of a particular rounded section without any corner. The oblong configuration, tapered at the ends, creates a nearly elliptical section, thus allowing its widen central body to house the above mentioned instruments.

This configuration grants additional stability to the portal's supporting surface.

The two housings 10, 12 placed one in front of the other, basically form the walls where people pass through for the inspection and they are connected by two cross bars or by a box structure 14 positioned at the top of the portal, that makes the gate stable and architectonically more agreeable. For aesthetical reasons, the walls can be smooth or striped with omega shape indentations, suitable to reduce the reflections of light or defects such as scratches or dirt caused by the use of the device itself.

The display zones 30, which are positioned in the front and in the rear sides of the gate, remain prevalently smooth. The cross bar or box structure 14 positioned above, could cover totally or partially the transit width according to the esthetical and functional requirements of the device.

Also the upper structure 14 could be made of one or more than one basic cross bar or by a box connection, suitable to contain the electronic equipments which refer to the transducers installed. It could also be constituted by cross bars suitable to contain all or a part of the control electronic equipments.

The choice to dispose the sensitive transducers 3, 4, 5, into both walls, constituted by the containers 10, 12 mentioned above, can be modified without altering the validity of the device that should include the detection equipments in a single system that, in this specific case, results to be a gate. This allows to save space, time of inspection and controllers, as required by those strategic applications such as airports. embassies and others, thus improving the transit flow and reducing inconveniences to passengers.

In particular combining all the sensors in the same housings 10, 12, allows to increase the liability of the checking and allows to reduce the number of people in charge of the checking and consequently the overall cost of the checking.

In case some equipments shouldn't be necessary, they could be removed reducing the functions of the system without altering the validity of the invention that, in its basis statement, as shown in the drawing, provides an essential and valid solution for the achievement of the above said advantages.

This multi-sensorial portal can be provided with a display, turned to the passenger in transit. The passenger will be informed by the display if to stop, by means of a "stop" signal, to proceed by means of a "go" signal or he could receive other information. The signals could be visual and/or acoustical.

The system, providing instructions to the passenger, could solve automatically the control activity. Therefore, the person in charge for the surveillance will be only engaged in the supervision of the correct procedure.

The man skilled in the art will appreciate that the detector in accordance with the present invention solve the conditions of security, esthetic and operation now requested in many official, public or private places, especially in airports. Although the narrow spaces available close to the gates do not allow install several equipments, the invention proposes a complete device which offers additional advantages such as a reduced impact for passengers, fast inspections, easy control, a reduced number of controllers at the gates, thus saving space as above described.

Of course the invention is not limited to the specific above described embodiments. The invention covers all the embodiments defined in the enclosed claims.

FIG. 5 illustrates the cross horizontal section of a control system portal in accordance with a specific embodiment of the present invention using two column coils 3, 5, in each housing 10, 12, respectively as a transmitter and a receiver one.

More precisely, coil 3 of housing 10 is a transmitter one referenced TX1, coil 5 of housing 10 is a receiver one referenced RX1, coil 3 of housing 12 is transmitter one referenced TX2 and coil 5 of housing 12 is a receiver one referenced RX2. In other words a first transmitter coil TX1 and a first receiver coil RX1 are placed on one side in a housing 10 and a second transmitter coil TX2 and a second receiver coil RX2 are placed on the other side in the second housing 12. The RX1 coil receives the signal issued by the TX1 coil, scanning the volume adjacent to the housing 10 it belongs to. The same RX1 coil receives also the signal issued by the second transmitter coil TX2, prospecting the whole transit volume according to the related diagonal. The same behaviour applies to RX2.

FIG. 6 illustrates the cross horizontal section of a control system portal in accordance with an alternative of the invention using in a first housing 10 two emitting coils 3, 5 and in the second housing 12 two receiving coils 3, 5.

More precisely, coil 3 of housing 10 is a transmitter one referenced TX1, coil 5 of housing 10 is also a transmitter one referenced TX2, coil 3 of housing 12 is a receiver one referenced RX1 and coil 5 of housing 12 is also a receiver one referenced RX2. In other words two transmitter coils TX1 and TX2 are placed on one side in a housing 10 and the two receiver coils RX1 and RX2 are placed on the other side in the second housing 12. The RX1 coil receives the signal issued by the TX1 coil and the signal issued by the TX2 coil. The same behaviour applies to RX2.

Of course the same detector may operate subsequently in the two modes illustrated respectively on FIGS. 5 and 6.

Moreover each receiver coil RX may subsequently operates as an emitting one TX and conversely each emitting coil TX may subsequently operates as a receiver one RX.

This layout allows discrimination of the masses carried laterally and/or centrally, by people in transit and eliminates directional effects due to the orientation of lengthened metal masses.

This solution allows the metal detector to achieve a better discrimination than the prior art, thanks to the possibility to generate with TX1, in a specific moment and giving a determined frequency, an electromagnetic field which is received at the same time by RX1 and RX2.

Afterwards or simultaneously, TX2 generates its own magnetic field that will be received by RX1 and RX2 as an induced electromagnetic force.

In this way, thanks to the crossed position of field generators and field receivers, it is easier to detect also laminar metal masses placed in the different orientations. The general directions of the respective emitted electromagnetic fields are illustrated under references C, D, E and F on FIG. 5 and G, H, I and J on FIG. 6. These figures clearly show that the invention leads to a plurality of crossed electromagnetic fields.

The above is an additional peculiarity of the column shape transducers that, beside their transmitting and receiving windings, improves their uniformity and discrimination characteristics.

By means of two column shape transmitting and two column shape receiving systems, thanks to the signals received and analysed, the present invention now offers a considerable improvement in the discrimination and considerably reduces the false alarm.

It is also common knowledge that the reduction of false alarms speeds up the inspection of passengers, saving time and personnel.

Another advantage of the invention is to warrant that all the active sensors, such as metal, radioactive, chemical or badge sensors, which are located in the same portal detector operate on a single and the same individual, versus prior art and separate sensors which can be erroneously influenced by a plurality of people leading to a possible false alarm. If necessary the sensing operation by the different sensors may be controlled by a means, such as a photoelectric barrier, suitable to detect when an individual penetrates into the portal, so as to assure that the detection is operated when such an individual is inside the portal, between the two housings 10, 12.

FIGS. 7 and 8 illustrate another specific embodiment in accordance with the present invention wherein at least one of the two housings 10, 12, and preferably both two housings 10, 12, is (are) provided with a plurality of X/Gamma sensors 40. Said X/Gamma sensors 40 are staggered on the height of the housing 10, 12, so as to cover all the height of said housing.

Dividing the means suitable to detect the X/Gamma rays in a plurality of sensors allows to determine easily the location, i.e. the place in height, of any detected X/Gamma rays source.

Moreover in accordance with the present invention the detector is preferentially provided with a general control means or general control Unit suitable to control and to change if necessary the sensitivity of one type of sensor in view of the signal outputted by another type of sensor.

More precisely in accordance with a specific embodiment of the present invention, the metal detector corresponding to the emitting and receiving coils, TX and RX, associated with control means, comprise at least a channel which is particularly adapted to detect lead (Pb) component (while other channels are suitable to detect other metals such as iron) as well as means suitable to increase sensitivity of said X/Gamma rays sensors 40 when said metal detector detects the presence of lead component. Such a provision allows to detect for example the presence of lead casing enclosing a radioactive source.

The above described provision of sensors staggered to cover all the height of a housing and the coupling of two types of sensors so as to change the sensibility of one type of sensor depending on the output of the other type of sensor, is not limited to X/Gamma sensors but covers any kind of sensors compatible with the present invention.

The invention claimed is:

1. A metal detector for control of protected access comprising two oblong shape vertical housings (10, 12), a structure (14) connecting the upper part of said vertical housings (10, 12) and emitting and receiving electrical coils (3, 5) provided in said housings (10, 12), characterized in that each of the two housings (10, 12) which comprises two separate emitting (3) and/or receiving (5) coils, wherein the coils operate so that each of the two housings (10, 12) comprises one emitting coil (TX) and one receiving coil (RX) and the detector comprises means controlling operation of said emitting and receiving coils so that when an emitting coil (TX1, TX2) provided in a housing (10, 12) is active, the two receiving coils (RX1, RX2) provided respectively in both the two housings are also simultaneously or subsequently active.

2. Detector according to claim 1, characterized in that a sensing operation by different sensors is controlled by a means, such as a photoelectric barrier, suitable to detect when an individual penetrates into the portal, so as to assure that the detection is operated when such an individual is inside the portal, between the two housings (10, 12).

3. Detector according to claim 1, wherein the coils operate subsequently in one of the following modes:
   in each of the two housings (10, 12) one coil operates as an emitting coil (TX) and one coil operates as a receiving coil (RX) and the detector comprises means controlling operation of said emitting and receiving coils so that when an emitting coil (TX1, TX2) provided in a housing (10,12) is active, the two receiving coils (RX1, RX2) provided respectively in both of the two housings are also simultaneously or subsequently active,
   in each of the two housings (10, 12) both coils operate as two emitting coils (TX1, TX2) or as two receiving coils (RX1, RX2) and the detector comprises means controlling operation of said emitting and receiving coils so that when an emitting coil (TX1, TX2) provided in a housing is active, the two receiving coils (RX1, RX2) provided in the other housing are also simultaneously or subsequently active.

4. Detector according to claim 1 characterized in that the emitting and receiving electrical coils (3, 5) are of column type.

5. Detector according to claim 4, characterized in that the emitting and receiving electrical coils (3, 5) of column type comprise helicoidal windings round about a cylindrical support core.

6. Detector according to claim 1, wherein said detector comprises means controlling operation of said emitting and receiving coils (3, 5) so that two emitting coils (3, TX1, TX2) are subsequently or simultaneously active, and when an emitting coil (3, TX1, TX2) is active, two receiving coils (5, RX1, RX2) are also simultaneously or subsequently active.

7. Detector according to claim 1, wherein said detector comprises an oblong shape base of support (16, 18) supporting respectively each vertical housing (10, 12) and suitable to be fixed at the floor and that does not present any edge, in order to avoid damages to persons in transit caused by accidental impacts.

8. Detector according to claim 1, wherein said detector comprises at least an additional type of sensor (4) provided in at least one of said housings (10, 12), in the vicinity of the emitting and receiving electric coils (3, 5).

9. Detector according to claim 1, in that in each housing (10, 12) said emitting and receiving electric coils (3, 5) are provided respectively on both sides of at least an additional type of sensor (4).

10. Detector according to claim 1, wherein said detector comprises at least an additional type of sensor (4) which is chosen in the group comprising at least one sensor suitable to detect ionizing radiations, at least one sensor suitable to detect the presence of explosive material or other specific substances and at least one sensor suitable for the badge readings of persons in transit.

11. Detector according to claim 1, wherein said detector comprises at least an additional type of sensor which is divided into a plurality of individual sensors which are staggered on the height of a housing (10, 12) so as to cover all the height of said housing.

12. Detector according to claim 1, wherein said detector comprises a plurality of X/Gamma sensors (40) staggered on the height of a housing (10, 12) so as to cover all the height of said housing (10, 12).

13. Detector according to claim 1, wherein said detector comprises at least two kind of sensors as well as a control unit suitable to control and to change when necessary the sensitivity of one type of sensor in view of the output of another type of sensor.

14. Detector according to claim 1, characterized in that said emitting and receiving coils (3, 5; TX, RX) are associated with control means adapted to detect lead component, said detector comprising furthermore X/Gamma sensors (40) as well as a control unit suitable to increase the sensitivity of the X/Gamma sensors (40) when said control means detect the presence of lead component.

15. Detector according to claim 1, wherein said detector comprises a badge reader associated to the emitting and receiving electrical coils (3, 5).

16. Detector according to claim 1, wherein said detector comprises indicator means (30) on said housings (10, 12) and/or on said structure (14) connecting the upper part of said housings.

17. Detector according to claim 1, wherein said detector comprises at least one symmetry plane (A, B).

18. Detector according to claim 1, wherein said detector comprises two symmetry planes (A, B).

19. Detector according to claim 1, characterized in that the ratio between the length and the width of the cross-section of the housings (10, 12) is comprised between 2 and 4, preferably about 2.75.

20. Detector according to claim 1, characterized in that the length of the cross section of the housings (10, 12) is comprised between 60 and 100 cm, preferably about 80 cm while the width of said cross section is comprised between 20 and 35 cm, preferably about 27.5 cm.

21. Detector according to claim 1, characterized in that the cross section of the housings (10, 12) is of elliptical form.

22. Detector according to claim 1, characterized in that the external surface of each housing (10, 12) comprises two plane and parallel panels (20, 22) connected at their ends by two rounded parts (24, 26).

23. Detector according to claim 1, characterized in that the external surface of said housings does not comprise any sharp edge.

24. Detector according to claim 1, characterized in that the external surface of the housing is smooth or striped with omega shape indentations to reduce optical reflection of light.

25. Detector according to claim 1, characterized in that information issued by a plurality of sensors, such as metal, radioactive, chemical or badge sensors, are displayed on a common signalling display (2).

26. Detector according to claim 1, characterized in that active sensors, such as metal, radioactive, chemical or badge sensors, which are located in the same portal detector operate on a single and the same individual.

* * * * *

UNITED STATES PATENT AND TRADEMARK OFFICE
CERTIFICATE OF CORRECTION

PATENT NO. : 7,592,907 B2  Page 1 of 1
APPLICATION NO. : 11/499073
DATED : September 22, 2009
INVENTOR(S) : Manneschi et al.

It is certified that error appears in the above-identified patent and that said Letters Patent is hereby corrected as shown below:

Column 8, Claim 9, line 1, after "claim 1," insert -- characterized --

Signed and Sealed this
Seventeenth Day of May, 2011

David J. Kappos
*Director of the United States Patent and Trademark Office*